United States Patent [19]
Kunze et al.

[11] Patent Number: 5,610,787
[45] Date of Patent: Mar. 11, 1997

[54] MAGNETIC TAPE APPARATUS WITH TAPE EDGE GUIDES FOR REDUCED TAPE EDGE WEAR

[75] Inventors: Norbert Kunze, Ehringshausen; Dieter Müller, Staufenberg, both of Germany

[73] Assignee: U.S. Philips Corporation, New York, N.Y.

[21] Appl. No.: 330,646

[22] Filed: Oct. 28, 1994

[30] Foreign Application Priority Data

Nov. 5, 1993 [DE]  Germany ............................ 43 37 812.9

[51] Int. Cl.$^6$ ............................................. G11B 15/60
[52] U.S. Cl. .................................................. 360/130.21
[58] Field of Search ....................... 360/130.21; 242/346, 242/346.1, 346.2, 358; 226/196, 199

[56] References Cited

U.S. PATENT DOCUMENTS

| | | | |
|---|---|---|---|
| 3,756,610 | 9/1973 | Naegele et al. | 274/4 R |
| 5,016,132 | 5/1991 | Okuda et al. | 360/130.21 |
| 5,134,536 | 7/1992 | Komatsu et al. | 360/130.21 |
| 5,202,808 | 4/1993 | Saito | 360/130.21 |

FOREIGN PATENT DOCUMENTS

| | | |
|---|---|---|
| 0350054 | 1/1990 | European Pat. Off. . |
| 0442512A2 | 8/1991 | European Pat. Off. . |

*Primary Examiner*—Stuart S. Levy
*Assistant Examiner*—William R. Korzuch
*Attorney, Agent, or Firm*—Michael E. Marion

[57] ABSTRACT

A tape guiding structure for a magnetic tape apparatus has two pairs of tape guide elements, each having upper and lower tape edge guiding limbs. The tape guide elements and a positioning holder for the magnetic head are formed as an integral injection-molded part. The elements of a first of the pairs are arranged to each side of the head respectively, adjacent the head, while those of the second pair are arranged further outward from the head, one to each side. The spaces between the guide limbs of each of the tape-guide elements have a dimension equal to the maximum width of the magnetic tape. The positions of the guide limbs of the first pair and of the second pair are arranged such that a magnetic tape having a minimum tape width has one edge in contact with a corresponding limb of each of the first pair, and the other edge in contact with the other corresponding limb of each of the second pair.

4 Claims, 2 Drawing Sheets

MAGNETIC TAPE APPARATUS WITH TAPE EDGE GUIDES FOR REDUCED TAPE EDGE WEAR

BACKGROUND OF THE INVENTION

The invention relates to a magnetic-tape-cassette apparatus having tape-guide means for a magnetic tape at the location of the head gaps of a magnetic head of the apparatus, comprising tape-guide elements which guide the magnetic tape relative to the magnetic head and the head gaps thereof, a first pair of tape-guide elements and a second pair of tape guide elements being provided at opposite sides of the magnetic head. The first pair of tape-guide elements are disposed directly adjacent the magnetic head, the second pair of tape-guide elements are disposed further outward and are spaced at a distance from the magnetic head and the tape-guide element adjacent this magnetic head. Each of the tape-guide elements are fork-shaped and have guide limbs which bound the transport path of the magnetic tape.

Such tape-guide means for a magnetic tape at the location of the head gaps of a magnetic head of a magnetic-tape-cassette apparatus are known from U.S. Pat. No. 5,202,808. Said means comprise an injection-moulded plastics part comprising a holder for a magnetic head and inner tape guide elements disposed directly adjacent the head face of the magnetic head at both sides of this head face, viewed in the transport direction. Said injection-moulded plastics part also comprises further outer tape guide elements, which are spaced from the inner tape-guide elements on the magnetic head and which ensure that the magnetic tape is guided over a greater length at both sides of the magnetic head.

The individual tape-guide elements are fork-shaped and accordingly they have guide limbs along which the tape can run. One guide limb of each of the tape-guide elements has a reference or contact face which extends vertically in relation to the tape-transport path, the contact face of the other guide limb being outwardly inclined relative to the transport path. All the contact faces of the tape-guide elements are adjusted in such a way that an edge of the magnetic tape, as it moves past the elements, is in contact with all the vertical contact faces when the adjustment of the head is correct.

U.S. Pat. No. 3,756,610 describes a magnetic-tape guide arrangement which also comprises pairs of guide elements. These pairs of guide elements are arranged at a distance at opposite sides of the magnetic head. Each pair of tape-guide elements has a sub-element with a guide edge past which the magnetic tape moves with one of its longitudinal edges, and a sub-element with a guide edge past which the magnetic tape moves with its other longitudinal edge. The distance of the guide edges in a direction transverse to the tape transport direction is $B_{min}$. This is the minimum tape width in compliance with the standard. For all tape widths larger than $B_{min}$ the magnetic tape is kinked at the edges between the closely spaced sub-elements of a pair of tape-guide elements owing to a sharp offset of the guide path. As a result, the magnetic-tape edges are subject to considerable wear.

From U.S. Pat. No. 5,134,536 it is known to construct all the tape-guide elements and a holder for the magnetic head as a single injection-molded part. However, the method of guiding the tape is different from that of the instant invention, described below, and leads to different operating results.

SUMMARY OF THE INVENTION

It is an object of the invention to provide a magnetic-tape-cassette apparatus of the type defined in the opening paragraph, in which tapes of all tape widths within the permissible tolerance range are guided correctly relative to the head gaps of the head.

According to the invention this object is achieved in that the respective space between the guide limbs of each of the tape-guide elements is dimensioned for the maximum tape width of the magnetic tape. The positions of the guide limbs of the first tape-guide elements with respect to the tape edges adjacent the magnetic head and with respect to the second outward tape-guide elements are adjusted in such a manner that in the transport direction in the case of the minimum tape width the magnetic tape has one edge in contact with the guide limbs on the magnetic head and the other edge in contact with guide limbs of the further outward tape-guide elements, and in that all the tape-guide elements and a positioning holder for the magnetic head are constructed as an integral injection-moulded part.

During the passage of a magnetic tape having a minimal tape width in compliance with the standard the magnetic tape is thus guided in the transport direction without edge deformation alternately at one tape edge and at the other tape edge. As the tape width increases guidance of the tape changes to full engagement with all the guide limbs, the tape edges being slightly deformed. However, since the guides are distinctly spaced apart the tape is not damaged. The position of the magnetic tape is re-oriented continually, resulting in an optimum movement of the magnetic tape past the head gaps.

In a further embodiment of the invention the contact faces of those guide limbs on the magnetic head with which the edge of the magnetic tape is in contact while the tape is moving past have a distance from the central, transport direction axis of the head gaps of the magnetic head corresponding to half the maximum tape width of the magnetic tape for which the magnetic head is aligned relative to the tape-guide elements. In the case of an average and minimum tape width the magnetic tape is thus moved past the head gaps of the magnetic head in an optimum manner.

In a further embodiment of the invention the outer tape-guide elements have a distance of approximately 8 mm from the inner tape-guide elements. Thus, the tape edges are loaded to a minimal extent, even in the case of the maximum tape width.

In a further embodiment of the invention all the four tape-guide elements and a positioning holder for the magnetic head are constructed as a single injection-moulded part and form a tape-guide unit. This ensures an optimum geometrical relationship between all the tape-guide elements and the magnetic head.

The invention will now be described in more detail with reference to the drawing.

DESCRIPTION OF THE PREFERRED EMBODIMENT

Figure 1:
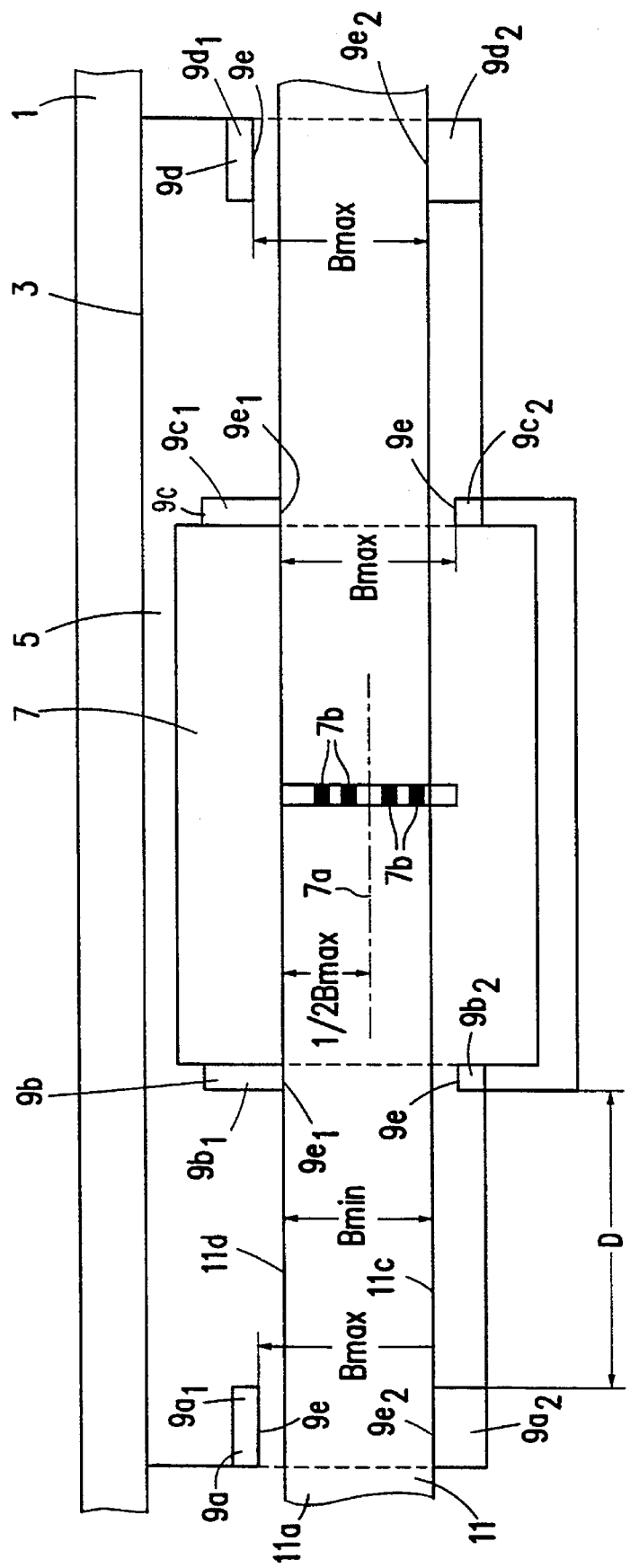
FIG. 1 shows diagrammatically a part of the head support of a magnetic-tape-cassette apparatus, on which support a magnetic-head/tape-guide unit is mounted in an accurately defined position, for example by snapping-on, in the case of the minimum tape width $B_{min}$.

The head support 1 shown in FIG. 1 holds a magnetic-head/tape-guide unit 3 which comprises a frame 5 in which a magnetic head can be glued. The magnetic-head/tape-guide unit 3 further comprises four tape-guide elements 9a, 9b, 9c and 9d. All four tape-guide elements are fork-shaped with two guide limbs $9a_1, 9a_2, 9b_1, 9b_2, 9c_1, 9c_2, 9d_1, 9d_2$. All the guide limbs have contact faces 9e which extend perpendicularly to a tape-transport path or plane 11a of a magnetic tape 11.

The distances between the contact faces 9e of the tape-guide elements 9a, 9b, 9c and 9d for the magnetic tape 11 are dimensioned for the maximum permissible width $B_{max}$ of a magnetic tape 11. The maximum width $B_{max}$ is 3.81 mm. Only negative deviations of up to 0.05 mm from this maximum width $B_{max}$ of 3.81 mm are permissible. The minimum tape width $B_{min}$ of the magnetic tape is consequently 3.76 mm. In the drawing the dimensions $B_{min}$ and $B_{max}$ have been exaggerated.

FIG. 1 represents the situation in which the tape width is $B_{min}$.

The tape transport is adjusted in such a manner that in the case of the minimum tape width $B_{min}$ the edge 11d of the magnetic tape 11 constantly engages against the contact faces $9e_1$ adjacent the magnetic head, which contact faces act as reference edges. In the case of the minimum tape width $B_{min}$ in as shown in FIG. 1 the edge 11c of the magnetic tape 11 at the same time engages against the outer contact faces $9e_2$, which serve as reference edges. In the drawing the tape widths $B_{max}$ and $B_{min}$ have been exaggerated. In reality these differences are hardly visible.

The position of the head gaps 7b relative to the contact faces is of particular importance. Therefore, the contact faces $9e_1$ of those guide limbs $9b_1, 9c_1$ on the magnetic head 7 with which the edge 11d of the magnetic tape 11 is in contact while the tape is moving past have a distance from the central axis 7a of the head gaps 7c of the magnetic head 7, which axis extends in the transport direction, corresponding to half the maximum tape width $B_{max}$ of the magnetic tape 11 for which the magnetic head 7 is aligned relative to the tape-guide elements 9.

Figure 2:
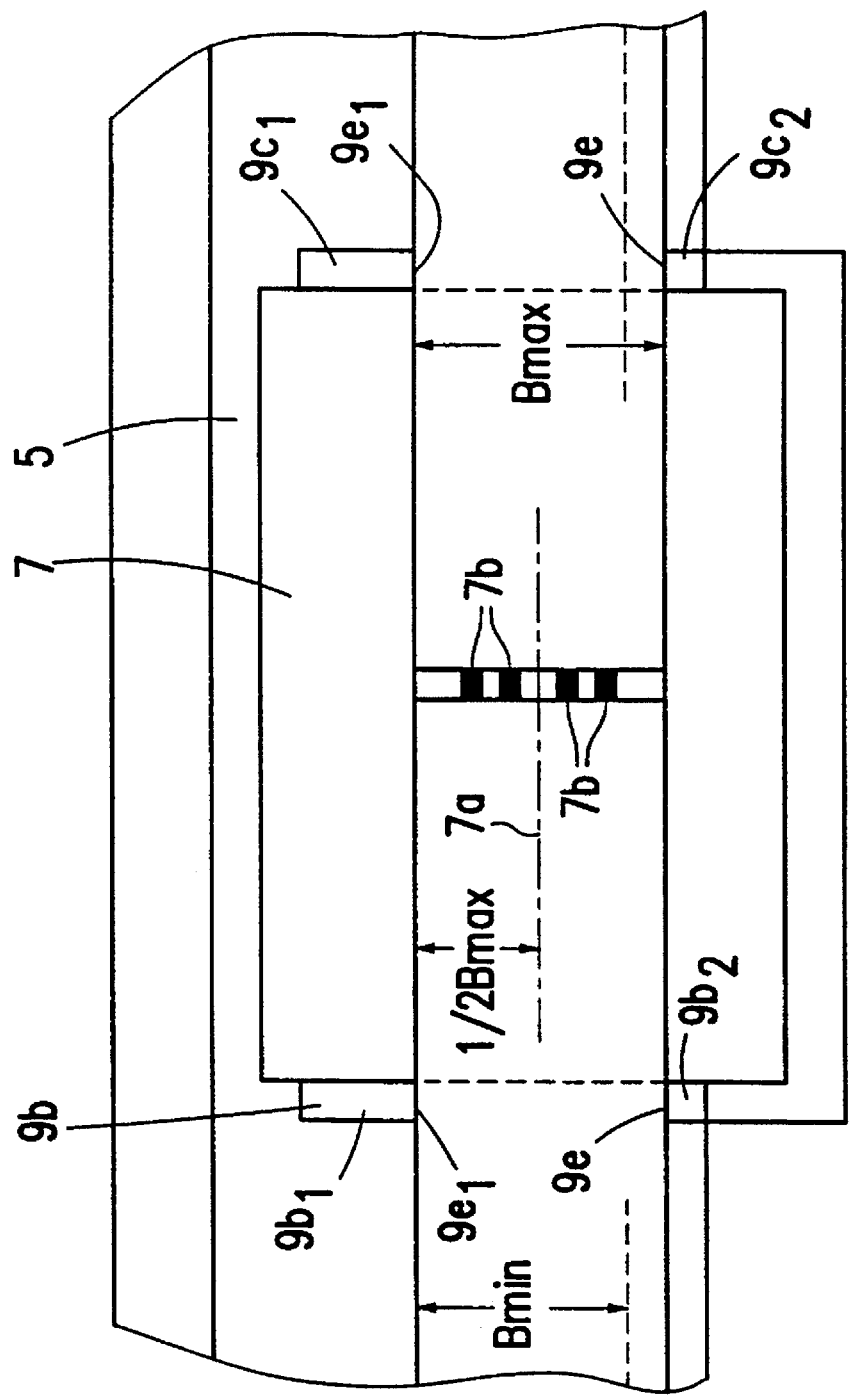
FIG. 2 shows a part of the unit in FIG. 1 in the case of a magnetic tape of maximum tape width.

FIG. 2 shows how in the case of the maximum width $B_{max}$ of the magnetic tape 11 the head gaps 7b are centered relative to the magnetic tape 11. A variation of the tape width between $B_{max}$ and $B_{min}$ only leads to a negligible shift of the tracks of the magnetic tape relative to the head gaps 7b of the head. The distance D of the outer tape guide elements 9a, 9d from the inner tape guide elements 9b, 9c is approximately 8 mm. This distance is in fact dictated by actuator-pin openings in the cassette front wall, which openings are situated between the opening, not shown, for the passage of the magnetic head and the openings, not shown, for the pressure rollers. The outer tape guide elements 9d engage in these actuator-pin openings.

We claim:

1. A magnetic-tape-cassette apparatus comprising a magnetic head having head gaps, and a tape guiding structure arranged at the location of the head and defining a transport path for a magnetic tape having a predetermined range of tape width, wherein the tape guiding structure comprises a first pair of tape-guide elements respectively disposed directly adjacent to and at opposite sides of the head, and a second pair of tape-guide elements respectively disposed further outward from said first pair and at opposite sides of the head, each of said tape-guide elements being fork-shaped and having first and second guide limbs which bound said transport path, and a positioning holder for the magnetic head and all said tape-guide elements being formed as an integral injection-molded part, characterized in that respective spaces between the guide limbs of each of said tape-guide elements have a dimension equal to the maximum width of the magnetic tape and wherein, the positions of the guide limbs of said first pair and of said second pair are arranged such that a magnetic tape having a maximum tape width has first and second edges of the tape in contact with the first and second guide limbs of said first pair and a magnetic tape having a minimum tape width has a first edge of the tape in contact with the first limb of each of said first pair, and a second edge of the tape in contact with the second limb of each of said second pair.

2. An apparatus as claimed in claim 1, wherein said guide limbs have contact faces, and said magnetic head has head gaps having a central axis in the direction of said transport path, characterized in that the contact faces on the guide limbs of said first pair, which are in contact with said magnetic tape having a minimum tape width, are spaced from said central axis by a distance corresponding to half said maximum width of the magnetic tape.

3. An apparatus as claimed in claim 1, characterized in that said tape-guide elements of said second pair are spaced from the respective tape-guide elements of said first pair by a distance of approximately 8 mm.

4. A tape guide unit for use in a magnetic-tape cassette apparatus, said cassette apparatus comprising a magnetic head having head gaps, said tape guide unit arranged at the location of the head and defining a transport path for a magnetic tape having a predetermined range of tape width, and said head gaps having a central axis in the direction of said transport path;

wherein the tape guide unit comprises:
   a first pair of tape-guide elements respectively disposed directly adjacent to and at opposite sides of the head, and,
   a second pair of tape-guide elements respectively disposed further outward from said first pair and at opposite sides of the head;
   each of said tape-guide elements having first and second guide limbs, each guide limb having a face, said first and second guide limb faces bounding said transport path;
   wherein:
   the respective spaces between the first and second guide limb faces of each of said tape-guide elements have a dimension equal to the maximum width of the magnetic tape;
   the positions of the guide limb faces of said first and second pair are arranged such that a magnetic tape having a maximum tape width has first and second edges of the tape in contact with the first and second guide limb faces of said first pair of tape-guide elements, and a magnetic tape having a minimum tape width has a first edge in contact with the first guide limb face of each of said first pair, and a second edge in contact with the second guide limb face of each of said second pair;
   the first guide limb face of each of the first pair of tape-guide elements are spaced from the central axis of the magnetic head by a distance corresponding to half the maximum width of the magnetic tape; and,
   the said two pair of tape guide elements and a positioning holder for the magnetic head are constructed as an integral injection-molded part.

\* \* \* \* \*